(12) United States Patent
Sanchez

(10) Patent No.: US 6,500,244 B2
(45) Date of Patent: *Dec. 31, 2002

(54) LIQUID SPRAY ABSORBING

(76) Inventor: Angelo Sanchez, 26 Tulip Ct., Nanuet, NY (US) 10954

( * ) Notice: Subject to any disclaimer, the term of this patent is extended or adjusted under 35 U.S.C. 154(b) by 5 days.

This patent is subject to a terminal disclaimer.

(21) Appl. No.: 09/751,091

(22) Filed: Dec. 29, 2000

(65) Prior Publication Data

US 2002/0023541 A1 Feb. 28, 2002

Related U.S. Application Data

(60) Provisional application No. 60/173,951, filed on Dec. 30, 1999.

(51) Int. Cl.[7] ............................................. B01D 47/02
(52) U.S. Cl. ............................................. 96/340; 96/351
(58) Field of Search .................... 95/226; 96/269, 96/278, 279, 333, 335, 337–376, 350–354

(56) References Cited

U.S. PATENT DOCUMENTS

| | | | | |
|---|---|---|---|---|
| 1,358,333 A | * | 11/1920 | Rudloff | |
| 1,664,333 A | * | 3/1928 | Taylor | |
| 1,876,465 A | * | 9/1932 | Misner | |
| 1,994,766 A | * | 3/1935 | Heglar | |
| 2,405,494 A | * | 8/1946 | Dupuy | |
| 5,660,616 A | * | 8/1997 | Choi et al. | |
| 5,820,657 A | * | 10/1998 | Driker et al. | |
| 5,873,930 A | * | 2/1999 | Sanchez | |
| 2002/0023451 A1 | * | 2/2002 | Sanchez | |

* cited by examiner

Primary Examiner—Duane S. Smith
(74) Attorney, Agent, or Firm—Eugene C. Rzucidlo

(57) ABSTRACT

A filtration device particularly for use with vacuum cleaners used for collection of fine liquid spray particles which tend to clog porous solid filters. The device utilizes readily replaceable liquid as a filtration medium with air being forced into the liquid then released for additional multiple liquid contacts. The device further includes horizontal baffles with air access apertures wherein one or more of the baffles can be perforated, mesh or absorbent therein which are positioned above the surface of the liquid, with a vacuum being applied to the area. This redirects liquid spray particle laden air into filtration contact with liquid multiple times wherein filtration efficiency is in excess of 99%. The perforated, absorbent or mesh baffle removes remaining mist or spray from the system or device.

14 Claims, 5 Drawing Sheets

LIQUID SPRAY ABSORBING

This application is a Continuation of U.S. Provisional Patent Application No. 60/173,951 filed on Dec. 30, 1999.

FIELD OF THE INVENTION

This invention relates to filtration of liquid spray drawn by a vacuum and particularly to filtration of the liquid spray by means of an absorbing filter including a liquid medium.

BACKGROUND OF THE INVENTION

The vacuum removal of particles or materials in an air stream, particularly of fine size, commonly entails materials such as gypsum, encountered with sanding of wallboard; sawdust; house dust, liquid spray from a spray booth and the like. Continued efficacious removal of the fine particles or materials in an air stream further requires the utilization of replaceable filtration elements usually made of cloth, foam, paper and the like which trap the particles. However, such filtration elements must be periodically replaced since clogging reduces vacuum removal efficiency and this is at an economic cost and with lost time involved in the replacement. In addition, such replacements are at periodic short time intervals, especially with heavy duty and continuous applications.

In response to the demands placed on solid porous filters, fluid filtration has been utilized wherein the particle laden air is vacuum drawn into contact with a fluid (invariably water) surface with particles being removed by such water surface as a filtration of the air. Efficiency of such removal is however less than ideal since the air is not actually drawn through the water in a manner similar to the solid filters, but is instead caused to contact the surface of the water, and at most only bubbled through a short depth beneath the exposed surface.

SUMMARY OF THE INVENTION

It is therefore an object of the present invention to provide a means for increasing the filtration efficiency of a liquid medium-containing filter.

It is a further object of the present invention to effect such increased efficiency by providing the liquid medium-containing filter with an apertured baffle system which directs and redirects spray laden air into multiple contacts with the filtering liquid medium surface.

These and other objects, features and advantages of the present invention will become more evident from the following discussion and drawings. in which:

DETAILED DESCRIPTION OF THE INVENTION

Figure 1:
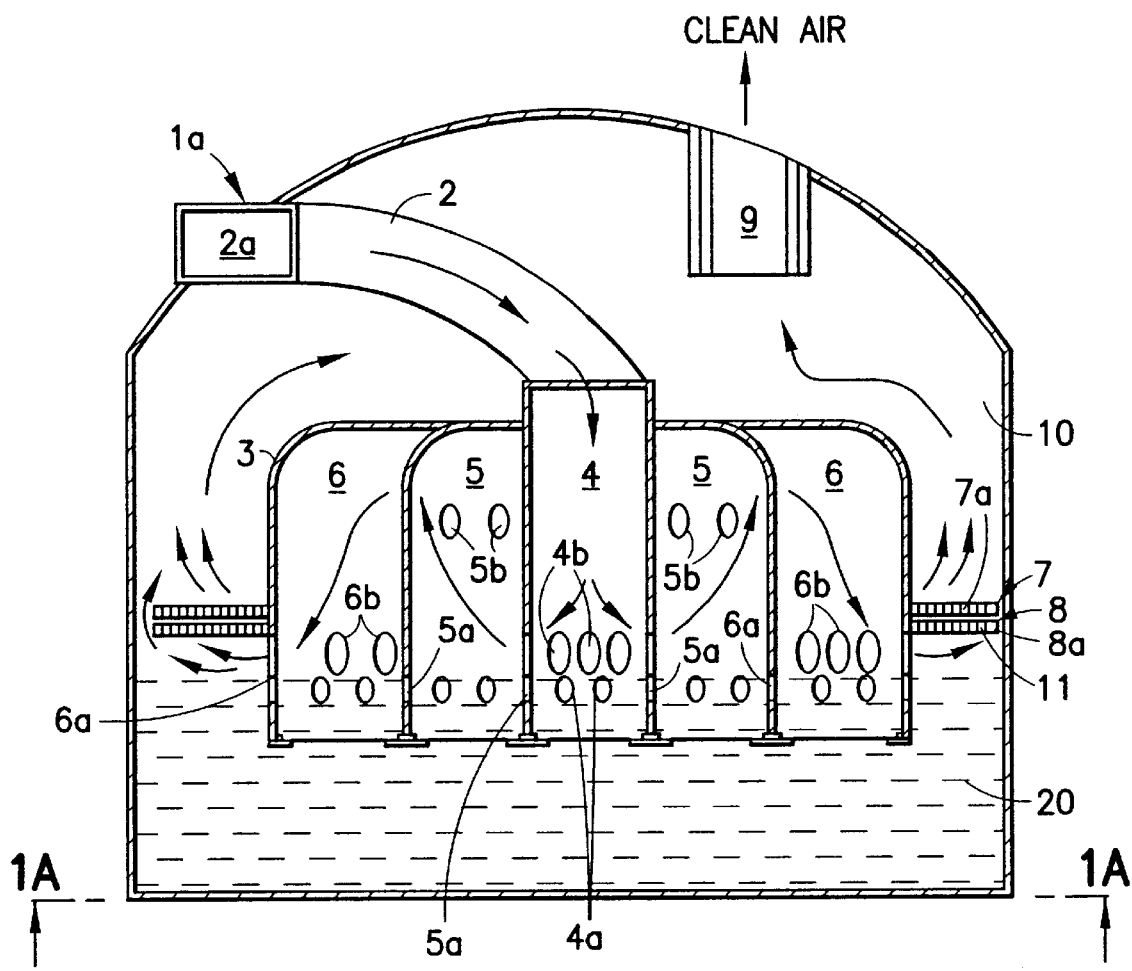
FIG. 1 is a schematic cross section side view of the filtering device of the present invention.
Figure 1A:
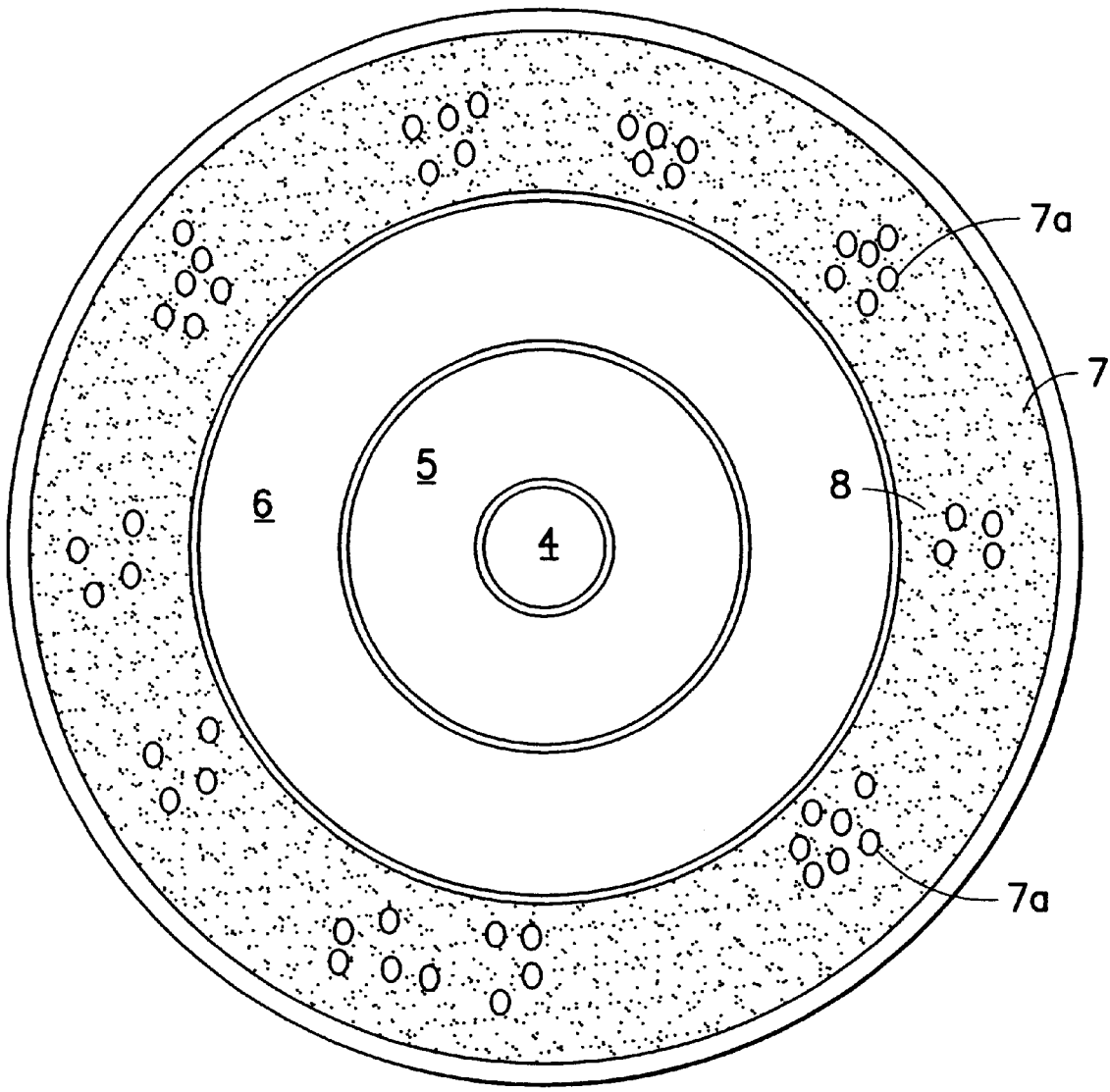
FIG. 1a is a bottom view taken along line A—A of the device as schematically shown in FIG. 1.
Figure 2:
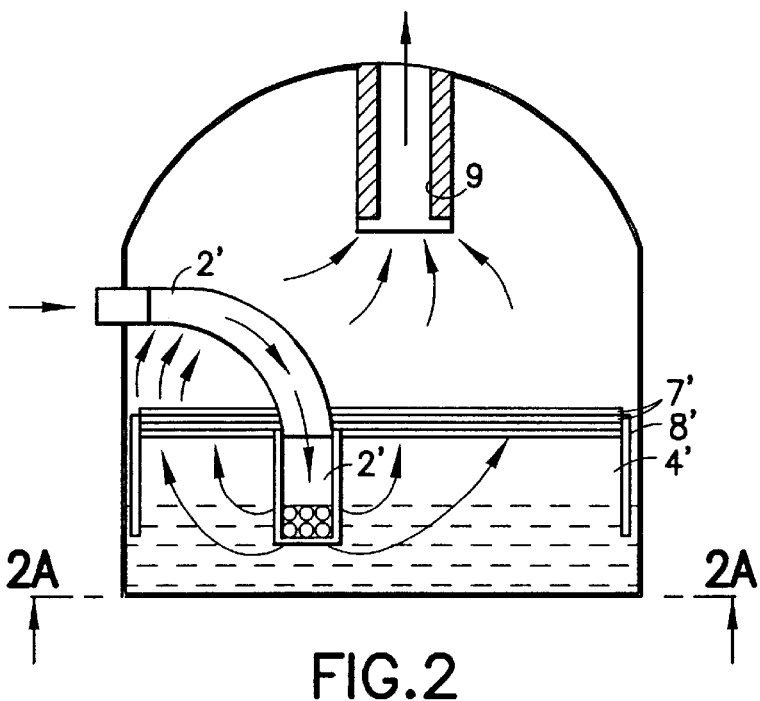
FIG. 2 is a schematic cross section side view of a second embodiment of the device of the present invention.
Figure 2B:
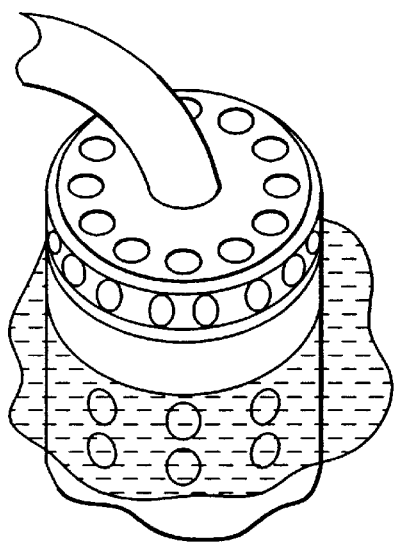
FIG. 2b is a schematic isometric view of the filtration device of FIG. 2.
Figure 2A:
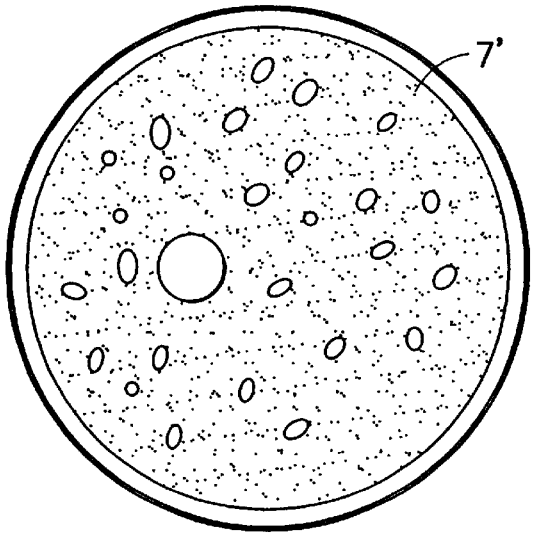
FIG. 2a is a bottom view taken along line B—B of the embodiment shown in FIG. 2.
Figure 3:
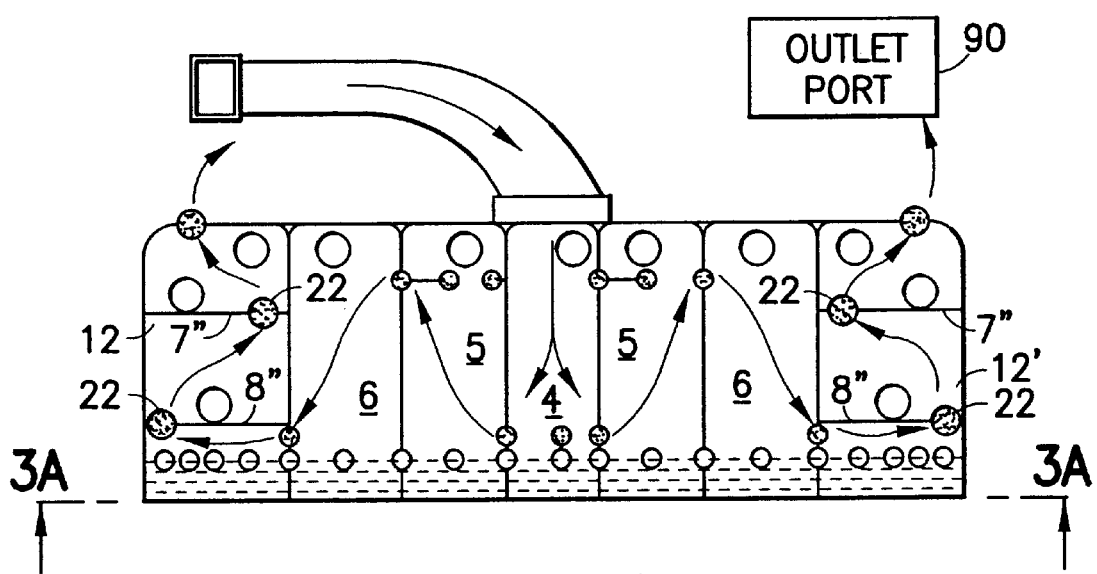
FIG. 3 is a schematic cross section side view of a third embodiment of the device of the present invention.
Figure 3A:
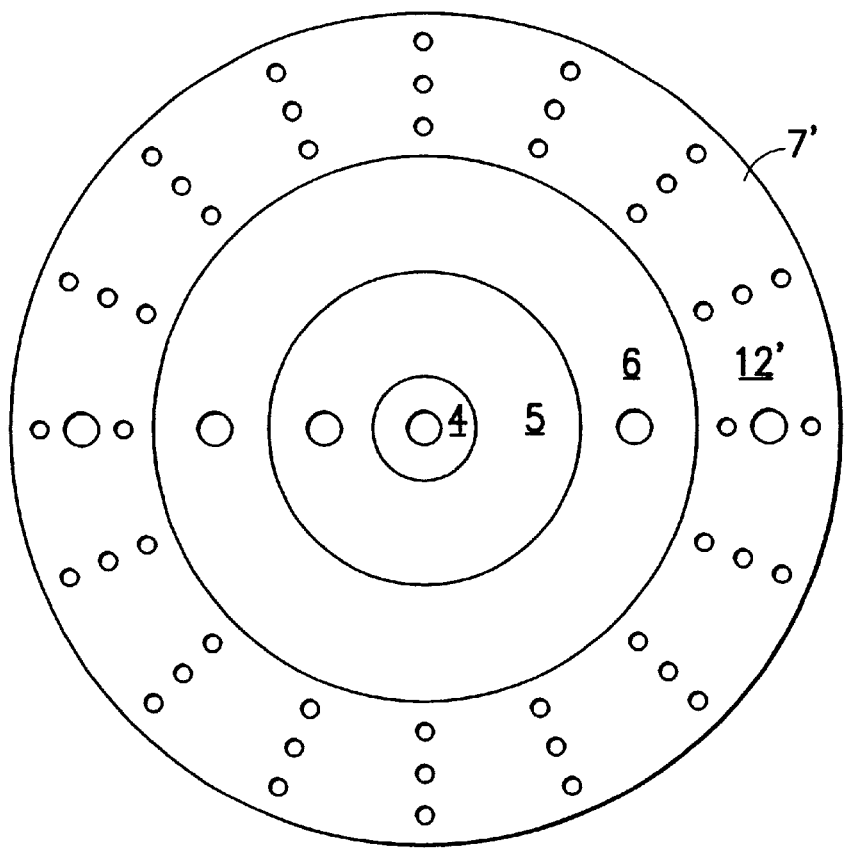
FIG. 3a is a bottom view taken along line C—C of the embodiment shown in FIG. 3.
Figure 4:
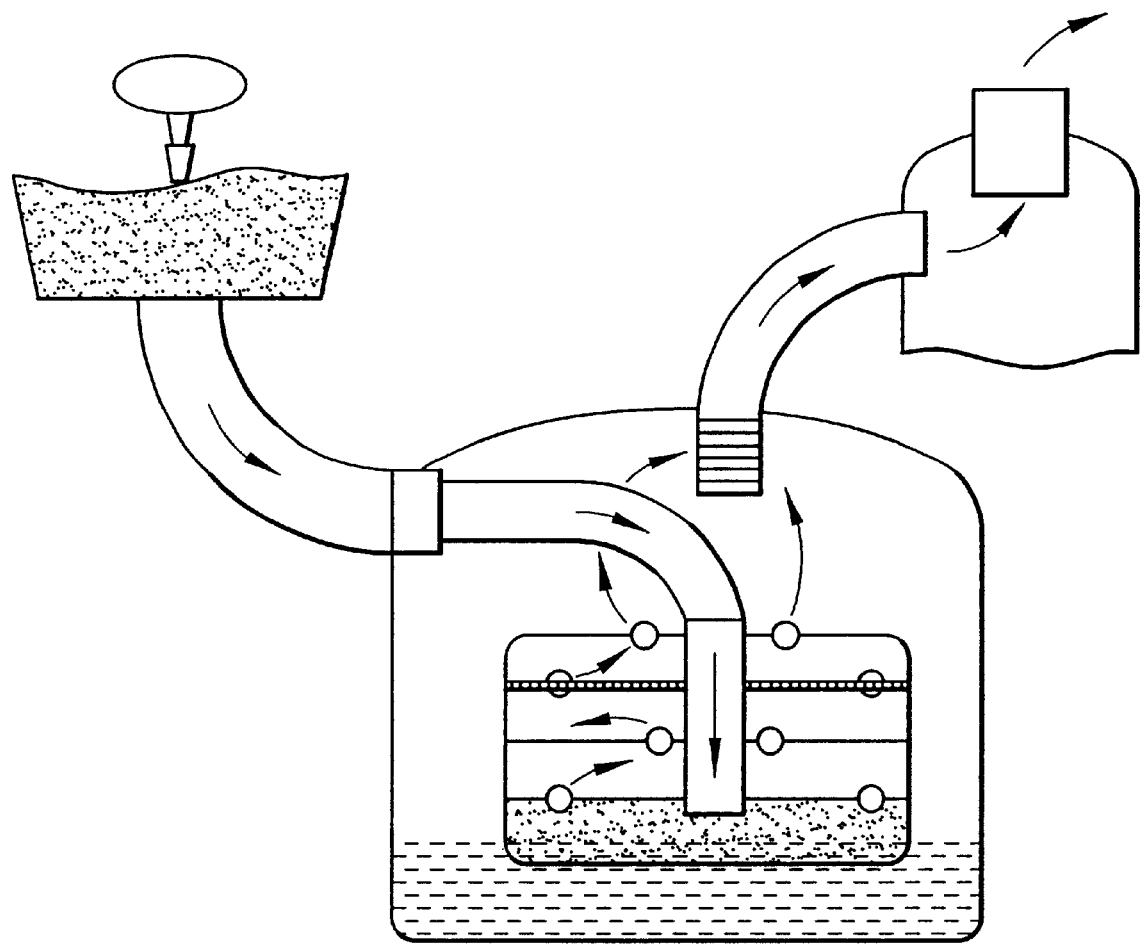
FIG. 4 is a schematic cross section view of a modified embodiment of the embodiment shown in FIG. 3, wherein dust laden air is introduced above the surface of the water and wherein the baffles are spaced further apart.

The device of the present invention is particularly suitable as an add-on adjunct for use with a spraying operation utilizing a vacuum pump device (shop vac type) and is useful in the collection of fine spray. With the present system, contaminated spray (such as paint and varnishes) can be eliminated prior to the expulsion into the environment. The device is permanent, except for the filtering liquid which requires infrequent changing and then only when the liquid is completely saturated. Since the liquid is not in the vacuum line path, its containment of spray materials does not affect vacuum operation except to the extent that it cannot contain additional particles with saturation. The device is operable by mixing the liquid into the incoming stream of spray laden air vacuumed into the receptacle of any vacuuming device. The mist or droplets of air bind the spray particles and materials thereby cleaning or filtering the air with efficiencies of removal as high as 99%. There are no moving parts or items subject to wear.

In a vacuuming device, such as a typical shop vac or industrial vac, a rotary motor therein creates a vacuum in a canister of vacuuming device which thereby pulls dust or sanding particles through an inlet port. In accordance with the present invention, the typical shop vac or industrial vac is modified such that the drawn air with spray particles or materials which is carried through an inlet port in the vacuum cleaning device and then by pipe or hose passageway into the body of the device is further carried into a conduit having an open end extending into a liquid filter comprised of one or- more apertured canisters containing the liquid.

If there are multiple canisters they are positioned concentrically relative to each other for maximum efficiency.

In a first embodiment, the air is fed by the hose passageway into a centrally positioned canister, having side apertures, leading to an adjacent canister. These side apertures are positioned at and adjacent to the liquid surface whereby the spray laden air is immediately brought into contact with increased surface area roiled water. After contact with the liquid (with substantial spray particle removal from the air), the air escapes to an adjacent second enclosed canister having an interior exposed to a liquid surface and with apertures above and at the water surface. The vacuum of the vacuum cleaning device pulls the spray-containing air through these apertures, thereby further causing it to contact the liquid or liquid surface for a contact residue-removal of additional liquid spray particles by means of the churning action occurring as the air hits the liquid surface. This action is further repeated, preferably for an additional time with another enclosed canister. Additional canisters may be used, as desired or to which extent the vacuum strength is capable of drawing the spray-containing air. The liquid filtered air is then drawn into the vacuum canister of the device and expelled through an exit or exhaust port. The bottoms of all the filtering canisters are open so that liquid flows thereunto to the proper levels as determined by the apertures in the walls of the respective canisters.

Increase of turbulence or agitation of the air in contact with a water surface results in increased removal by the liquid of the spray contained in the air. Accordingly, in operation, the filtering device of the present invention comprises at least two and preferably at least three chambers for filtering liquid spray-containing air by causing a contact between the liquid spray laden air and a liquid surface, with misting and mixing of the liquid spray-containing air with water droplets together with the physical action involved in the air and water being drawn through small openings. By arranging the apertures between the canisters to be staggered in an up-down position there is additional turbulence created by the movement of the liquid spray laden air as it contacts the liquid surface.

In a further preferred modification, perforated baffles (preferably two coextensive baffles) are positioned in the outer liquid container between the exit from the outermost canister, relative to the inlet conduit, and the air outlet port. The baffles are positioned above a liquid surface to provide, with the baffle placed closest to the outermost canister apertures, a final directing of the air to the liquid surface for removal of any residual spray, before the air is externally expelled. In order to permit proper air exhaust rates without a build-up of excessive internal pressure, the baffles do not extend to completely close the outlet to the outlet port and the perforations therein are preferably about 1/8" (3 mm) and spaced along the surface of the baffles. Perforations between the baffles are however arranged to be out of line with one another to thereby cause air to meander and be further filtered by contact with surfaces along its exit path. Alternatively, the baffles can be directly contained within the outermost canister and positioned between the outlet apertures of the canister and the surface of the liquid, for effecting continued redirecting of the air onto the liquid surface, until the air exits through the baffles and outlet apertures to the exhaust port.

In a second embodiment of the present invention, liquid spray laden air is initially drawn directly into the filtering liquid and allowed to escape from the conduit below the surface of the liquid through the conduit end and side apertures, which are positioned below the surface of the liquid. The conduit extends through baffle members which form an enclosed area between the liquid surface and the exhaust port with the baffles providing a redirecting of the air to the liquid surface for continued filtering by contact therewith until it is able to exit the apertures in the baffles to the exhaust port.

DETAILED DESCRIPTION OF THE PREFERRED EMBODIMENTS AND THE DRAWINGS

With respect to the drawings, in FIG. 1, the intake portion 1*a* of shop vac 1 is shown with intake 2*a* leading into intake conduit 2. Intake conduit 2 directs the liquid spray laden air into central canister 4 which is open at its lower end into a liquid reservoir 20 contained within vacuum canister 10. Concentric canisters 5 and 6 are similarly open at their lower ends into the reservoir 20 whereby the liquid reaches a common level. Canisters 4, 5 and 6 each have two sets of apertures in the side walls thereof 4*a*, 5*a* and 6*a*, respectively, which are positioned at the surface of the liquid. In addition, each of the canisters has a second set of apertures 4*b*, 5*b* and 6*b* respectively which are positioned in the side walls of the canisters but above the liquid surface and staggered (above or below) the apertures of the adjacent canisters. Thus, as shown apertures 4*b* and 6*b* are low and apertures 6*b* are high in the walls of the respective canister. As previously described, the staggered aperture arrangement increases liquid roiling and filtering effect. Stacked apertured baffle elements 7 and 8 extend from the outer walls of outermost canister 6 but do not extend to the wall of the vacuum canister thereby providing a non-restricted partial air passageway 11. Baffle elements 7 and 8 are positioned above apertures 6*a* and 6*b* whereby air exiting apertures 6*a* and 6*b* is immediately redirected thereby into additional contact with the liquid surface before the air is exhausted to exhaust port 9 through apertures 7*a* and 8*a* respectively in baffles 7 and 8 and through air passageway 11. As shown in FIG. 1, apertures 7*a* and 8*a* are not aligned to cause air to meander therebetween with surface contact with each of the baffles (for final residual dust removal) prior to exhaust exiting of the air.

As more clearly seen in FIG. 1*a*, canisters 4, 5 and 6 are concentric to each other and baffles 7 and 8 are configured as cantilevered ring flanges for maximum initial contact with air exiting from canister 6.

In FIGS. 2, 2*a* and 2*b* a second embodiment 1' of the liquid filter of the present invention is shown with direct positioning of conduit 2' into liquid contained within single canister 4' to a depth of about ½" (13 mm). In this embodiment conduit 2' is apertured below the liquid surface whereby the air is bubbled through the liquid for filtration thereof. When the air exits the liquid, as shown by the arrows, it is re-directed to the liquid surface for additional filtration, until the air by-passes apertured baffles 7' and 8' to be exhausted through exhaust port 9.

The embodiment shown in FIGS. 3 and 3*a* is similar to that shown in FIGS. 1 and 1*a* but with an additional outermost canister 12' in which baffles 7" and 8" are internally positioned with non-aligned apertures 22 leading to outlet port 90.

In FIG. 4, the embodiment of FIG. 3 is shown with the inlet 20 port is positioned above rather than into the liquid.

The instant device uses a replaceable water and/or oil mixture which may include a "Flour" type "Slurry" as a filtration medium. Contaminated spray is forced into the above medium where it mixes and is filtered by multiple contacts.

The devices also include horizontal and/or vertical baffles with air apertures positioned above the surface of the water. The vacuum force redirects the medium mixed spray into further filtration contact with the medium and through the baffle apertures.

A finely perforated or absorbent or mesh baffle plate finally filters any excess to produce a filtration efficiency in excess of 99%.

The liquid medium can be a medium composed of oil and/or water mixture. Mixture may be a water or oil base slurry depending on contaminated spray-paint (water, oil)—varnish, etc.

It is understood that the above description and specific embodiments are only illustrative of the present invention and that changes in structure, type and arrangement of the water filtering elements and the like may be made without departing from the scope of the present invention as defined in the following claims.

What is claimed is:

1. A device for filtering liquid spray laden air which is adapted to be used with a vacuum cleaning device, said filtering device comprising a liquid reservoir and at least one canister, having an open end, positioned within the liquid reservoir whereby the canister contains liquid to a predetermined level therein, with said device being adapted to be connected between an air intake and outlet of the vacuum cleaning device, wherein said filtering device comprises means for directing liquid spray laden air, entering the air intake, into contact with liquid from the liquid reservoir for a successive multiple number of times, for continued removal of liquid spray from the air by the contacted liquid and wherein said device comprises means for roiling the contacted liquid during said contact.

2. The device of claim 1, wherein said filtering device comprises at least two successively adjacent chambers with apertured connection between adjacent chambers, which chambers are positioned in said liquid reservoir to have a common liquid level and wherein the apertured connection between the successively adjacent chambers is positioned at the common liquid level, wherein the air intake is connected to a first chamber to direct liquid spray laden air thereto and wherein the air outlet is connected a last chamber of the at least two successively adjacent chambers.

3. The device of claim 2, wherein the means for roiling the contacting liquid comprises additional apertured connections between successively adjacent chamber, which are successively positioned at different height levels relative to the water level whereby entering air causes said roiling.

4. The device of claim 2, wherein the device comprises at least two apertured spaced apart baffle members positioned parallel to each other and with a first of the baffle members being positioned, such that air from the last chamber is directed by the first baffle member into contact with the liquid of the reservoir and then through the apertured baffle members to the air outlet of the vacuum cleaning device.

5. The device of claim 4, wherein the baffle members comprise apertures which not in alignment with apertures of a baffle member adjacent thereto.

6. The device of claim 5, wherein the baffle members are positioned in the last chamber.

7. The device of claim 6, wherein the baffle members are positioned outside of the last chamber in a position between an outlet of the last chamber and the outlet of the vacuum cleaning device.

8. The device of claim 1, further comprising a finishing baffle plate made of an absorbing material or mesh to remove the remaining mist or spray.

9. The device of claim 2, further comprising a finishing baffle plate made of an absorbing material or mesh to remove the remaining mist or spray.

10. The device of claim 3, further comprising a finishing baffle plate made of an absorbing material or mesh to remove the remaining mist or spray.

11. The device of claim 4, further comprising a finishing baffle plate made of an absorbing material or mesh to remove the remaining mist or spray.

12. The device of claim 5, further comprising a finishing baffle plate made of an absorbing material or mesh to remove the remaining mist or spray.

13. The device of claim 6, further comprising a finishing baffle plate made of an absorbing material or mesh to remove the remaining mist or spray.

14. The device of claim 7, further comprising a finishing baffle plate made of an absorbing material or mesh to remove the remaining mist or spray.

* * * * *